United States Patent [19]

Wang

[11] Patent Number: 4,701,752
[45] Date of Patent: Oct. 20, 1987

[54] MIRROR INVERSE FUNCTION IN AN INTERACTIVE GRAPHICS SYSTEM

[75] Inventor: John S. Wang, Travis County, Tex.

[73] Assignee: International Business Machines Corp., Armonk, N.Y.

[21] Appl. No.: 790,888

[22] Filed: Oct. 24, 1985

[51] Int. Cl.$^4$ .............................................. G09G 1/06
[52] U.S. Cl. .................................. 340/723; 340/724; 340/726; 340/727
[58] Field of Search ............... 340/710, 712, 723, 724, 340/725, 726, 727

[56] References Cited

PUBLICATIONS

"Diagraph", Computer Support Corp. 1984, pp. 22–25.
Kaehler et al. "MacPaint TM", Apple Computer Corp. 1983.

Primary Examiner—Gerald L. Brigance
Assistant Examiner—Mahmoud Fatahi-Yar
Attorney, Agent, or Firm—C. Lamont Whitham

[57] ABSTRACT

A procedure for generating a mirror image of a graphic object on an interactive computer graphics display is disclosed. In the specific example described, a cursor locating device such as a mouse and an all points addressable display are assumed. The graphics object for which the mirror image is to be generated is selected by the pointing cursor. The mirror image function is also selected by the pointing cursor. This causes a default mirror image to be generated on the display along with the original image of the selected graphics object. In addition, a "mirror" with a direction handle and an angle handle is displayed in a window on the display. Either of these handles may be "grabbed" by selecting with the pointing cursor and then rotated to manipulate the generated mirror image and the selected object on the display. When the direction handle is rotated, the generated mirror image and the selected object are simultaneously rotated in the plane of the display. When the angle handle is rotated, the generated mirror image and the selected object are simultaneously stretched or shrunk depending on the direction of rotation to provide a "butterfly" effect.

3 Claims, 7 Drawing Figures

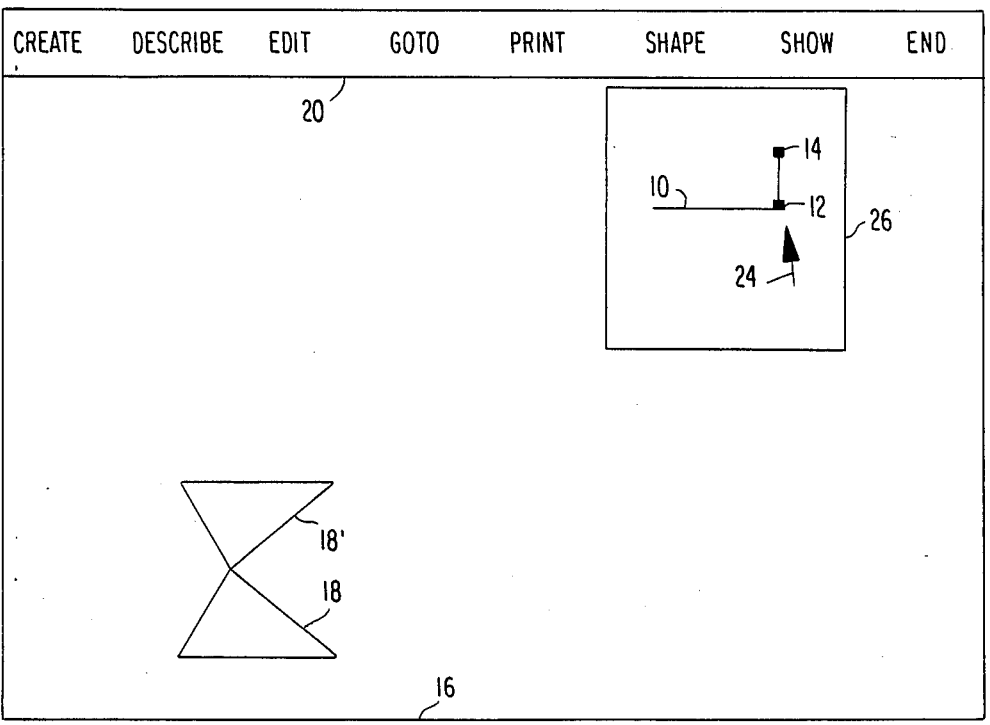
FIG.3
FIG.4
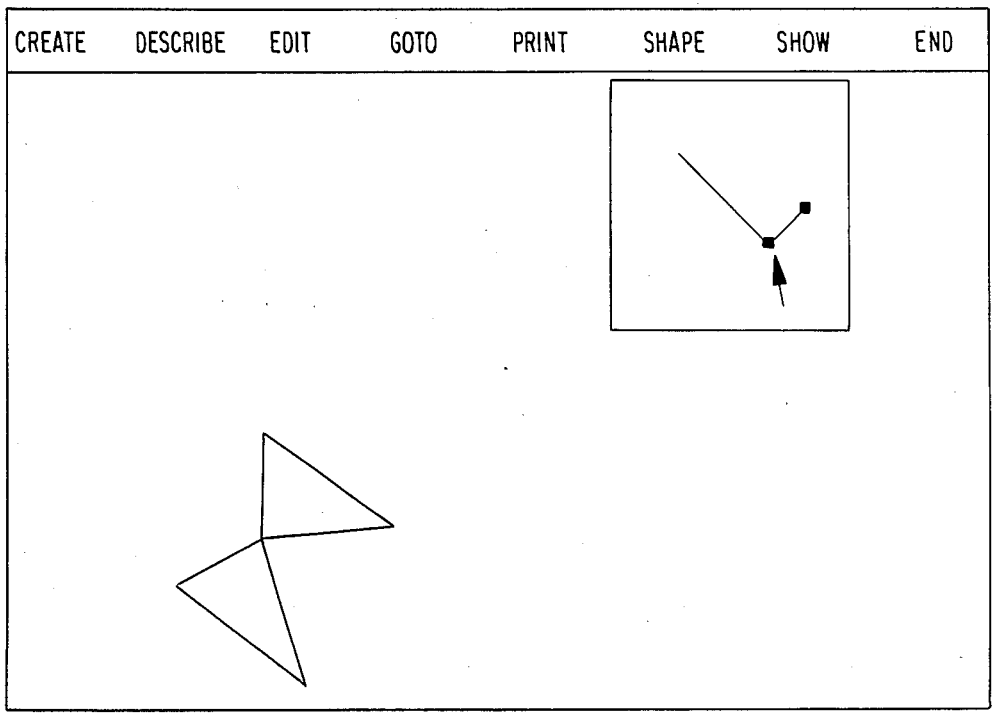

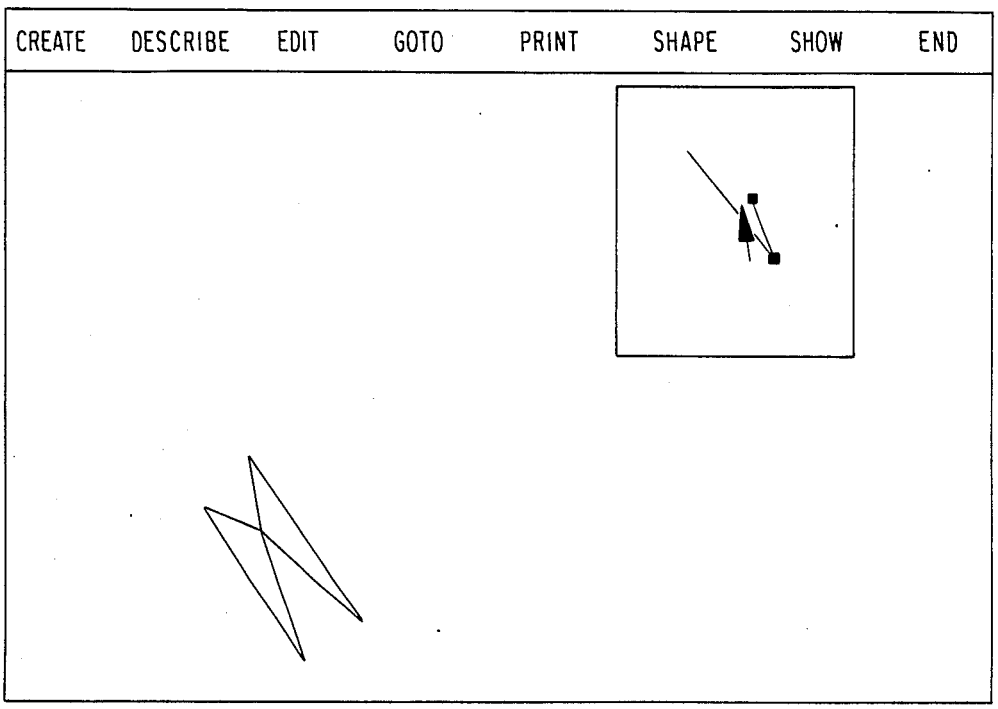
FIG. 5
FIG. 6
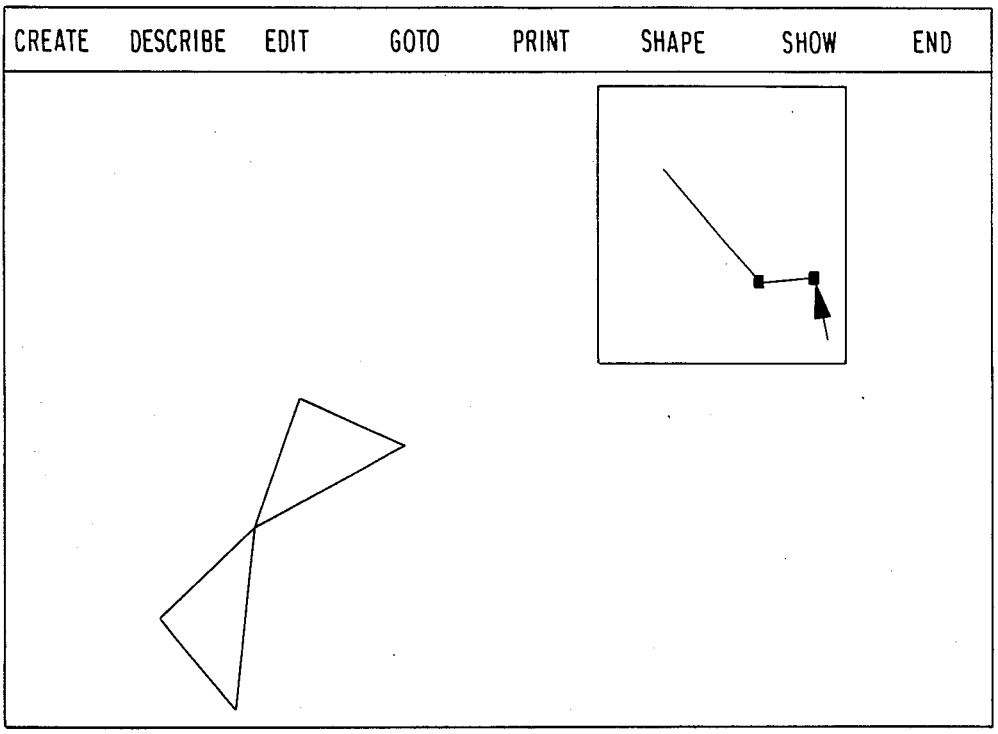

MIRROR INVERSE FUNCTION IN AN INTERACTIVE GRAPHICS SYSTEM

FIELD OF THE INVENTION

This invention generally relates to computer interactive graphics display systems and, more particularly, to a system which will automatically generate a mirror image of a graphic object. The mirror image is initially generated in a default position, and the user can interactively adjust the angle of the original graphic object and its image on the display screen and the angle between the original and mirror images to produce a "butterfly" effect.

DESCRIPTION OF THE PRIOR ART

Computer graphics displays for microcomputers or so-called personal computers are in much demand for presentation of business graphics. Generation of bar charts, pie charts and line graphs based on data in a data base or a spread sheet is a common function. Business graphics systems have been augmented by draw graphics functions which allow the generation of primitive graphics objects such as circles and rectangles. More sophisticated draw graphics functions allow free hand drawing and the generation of complex curved shapes as well as primitive graphics objects. The availablity of these draw graphics functions provides the user with an interactive capability to generate presentation graphics that enhances the basic business graphics.

One function that would be desirable in a draw graphics function would be to generate the mirror image of a graphics object which has been previously generated on the computer display screen. A mirror image often adds a dramatic effect which is highly desirable. However, in known microcomputer application programs, such a mirror image function has not been provided. Manually inverting a graphic object requires tedious redrawing. It is of course known in some very large computer aided drafting (CAD) systems, particularly those designed for architects, to provide a mirror image function. The mirror image function in these large CAD systems would typically be used for inverting a floor plan in a development where the same floor plan may be used many times, but to provide some variation, the plan is used in both its original and inverted versions. As mentioned, such a mirror image function is not available in microcomputer applications. Moreover, the mirror image function provided in the large CAD systems allows a mirror image to be generated only in the same plane as the original image.

SUMMARY OF THE INVENTION

It is therefore an object of this invention to provide a mirror image function in an interactive computer graphics system which is adapted to be run on a microcomputer.

It is another object of the invention to provide a mirror image function which allows the user of an interactive graphics system to specify the angle of the plane in which the mirror image is generated.

According to a preferred embodiment of the present invention, the user of an interactive graphics system is provided with a "mirror" in a pop down window on the computer display. The user can then rotate and/or manipulate the angle of the plane of the mirror to obtain the effect he wants. Using this invention, a combination of both the original and the mirror images appear on the computer display.

A real mirror function should consider the angle of the mirror which sits on the flat plane of the original image. By manipulating the angle of the mirror, the original graphic image and its mirror image can be stretched in both directions or even folded into one line, just like a butterfly's wings opening and folding along the line of its body. The mirror function in this invention is equivalent to the "butterfly folding" which combines the original image and the image inside the mirror.

The "mirror" which is displayed in the window on the computer display is provided with two "handles", a direction handle and an angle handle. When the mirror direction handle is "grabbed" by means of a pointing cursor, for example, the mirror image and the original graphic object can be rotated. When the mirror angle handle is "grabbed", the original image and its mirror image can both be modified according to the amount of rotation of the angle handle. For example, when the mirror angle handle is at 90 degrees to the angle of the mirror, the mirror image is exactly the same size as the original image. When the mirror angle handle is at negative 90 degrees (counter clockwise), the original image and the mirror image are folded into a line. For any amount of angle increase clockwise, the original image and the mirror image will both be stretched simultaneously. For any amount of angle increase counter clockwise, the original image and its mirror image will shrink simultaneously.

BRIEF DESCRIPTION OF THE DRAWINGS

The foregoing and other objects, aspects and advantages of the invention will be better understood from the following detailed description of a preferred embodiment of the invetion with reference to the accompanying drawings, in which:

FIG. 3 is an illustration of the edit window on a computer graphics display showing the original graphic object and its mirror image and also showing the selection of the mirror direction handle;

FIG. 4 is an illustration of the edit window on a computer graphics display showing the result of rotating the mirror direction handle;

FIG. 5 is an illustration of the edit window on a computer graphics display showing the result of rotating the mirror angle handle counter clockwise;

FIG. 6 is an illustration of the edit window on a computer graphics display showing the result of rotating the mirror angle handle clockwise.

DETAILED DESCRIPTION OF THE PREFERRED EMBODIMENT OF THE INVENTION

In this description, it is assumed that the computer graphics display is an all points addressable (APA) or bit mapped display such as a cathode ray tube (CRT), liquid crystal display (LCD), plasma display or the like which is driven by a standalone or host connected computer work station. Further, it is assumed that the work station is provided with a pointing device; i.e., a pointing cursor controlled by a mouse, joy stick or the like. The mouse, for example, would be provided with two keys or buttons, one being a select key and the other being a command key. An object on the computer display screen can be selected by moving the pointing cursor to the object in the edit space and pressing the select key. By moving the pointing cursor to a command on a command bar outside the edit space and pressing the select key, a pop down menu is displayed showing the functions which may be selected. Selections from the pop down menu are made in the same manner as selecting an object to be edited.

Figure 1:
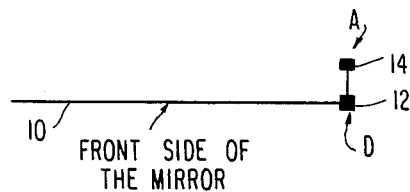
FIG. 1 is an illustration of the computer graphics display of a "mirror" according to the invention showing the mirror direction handle and the mirror angle handle.

Referring now to the drawings, and more particularly to FIG. 1, the "mirror" which is diplayed on the computer graphics screen is shown as comprising the mirror itself 10 and two handles at one end of the mirror. The first handle 12 is the mirror direction handle, and the second handle 14 is the mirror angle handle. The mirror direction handle 12 is for rotating the mirror in the plane of the display screen. By grabbing the mirror angle handle 14, the mirror angle can be modified. The maximum angle of the mirror direction handle movement is plus or minus 90 degrees in the preferred embodiment of the invention, but this 180 degree range is defined arbitrarily and could be changed as desired.

The opposite side of the mirror from the mirror angle handle is defined as the front of the mirror. By grabbing the mirror angle handle and rotating it with respect to the mirror, a "butterfly" effect can be produced, as will be described in more detail with reference to FIGS. 5 and 6 of the drawings.

Figure 2:
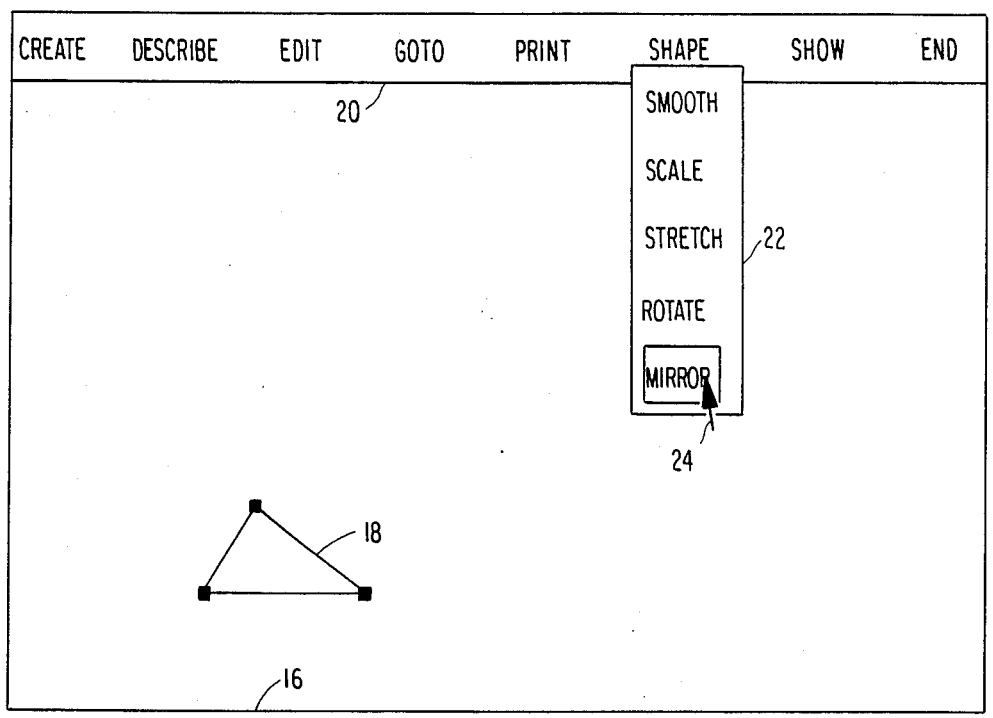
FIG. 2 is an illustration of the edit window on a computer graphics display showing a simple graphic object and the pop down menu from which the mirror function may be selected.

Referring now to FIG. 2, there is shown a computer graphics display edit window 16 in which a simple graphic object 18 has been generated. It should be understood, however, that the invention is applicable to complex graphic objects and is not limited to simple graphic objects of the type shown. This simple graphic object has been selected for purposes of illustrating the invention as will be better appreciated as the description progresses. At the top of the edit window 16 is a command bar 20 which displays the various functions which can be performed within the edit window.

Assume now that the user wants to generate a mirror image of the graphic object 18. In order to do so, he would first select the object by moving a pointing cursor to the object and pressing the select key as described above. After the graphic object has been selected, the mirror function must then be selected. This is done by moving the pointing cursor to the SHAPE function on the command bar 20 and pressing the select key. Doing this causes the pop down menu 22 to be displayed. This menu has several functions from which the user may make a selection. In this case, the user moves the pointing cursor 24 to the MIRROR function and presses the select key causing the word "mirror" to be highlighted as indicated by the rectangle surrounding the word. This provides positive feedback to the user to show the function which has been selected.

After the mirror function has been selected, a second pop down window 26 is then displayed as shown in FIG. 3. This pop down window contains the mirror object 10 with its two handles 12 and 14. When the mirror direction is parallel to the bottom of the display screen and the angle handle 14 is 90 degrees with respect to the mirror 10 (the default position), the default image 18' is displayed. By grabbing the mirror direction handle 12 using the pointing cursor 24 and while the select key is pressed, the user can rotate the mirror in any direction about an axis perpendicular to the direction handle 12. The effect of a clockwise rotation of the handle is shown in FIG. 4. It will be noted that both the original image 18 and the mirror image 18' have been rotated by about 45 degrees. The image is fixed on the screen when the user releases the select key.

In a similar fashion, the user may "grab" the mirror angle handle 14 using the pointing cursor and pressing the select key. While the select key is pressed, the user may rotate this handle causing the "butterfly" effect mentioned previously. FIG. 5 shows the mirror angle handle rotated counter clockwise causing both the original image 18 and its mirror image 18' to simultaneously shrink. FIG. 6 shows the mirror angle handle rotated clockwise causing both the original image 18 and its mirror image 18' to be simultaneously stretched.

Figure 7:
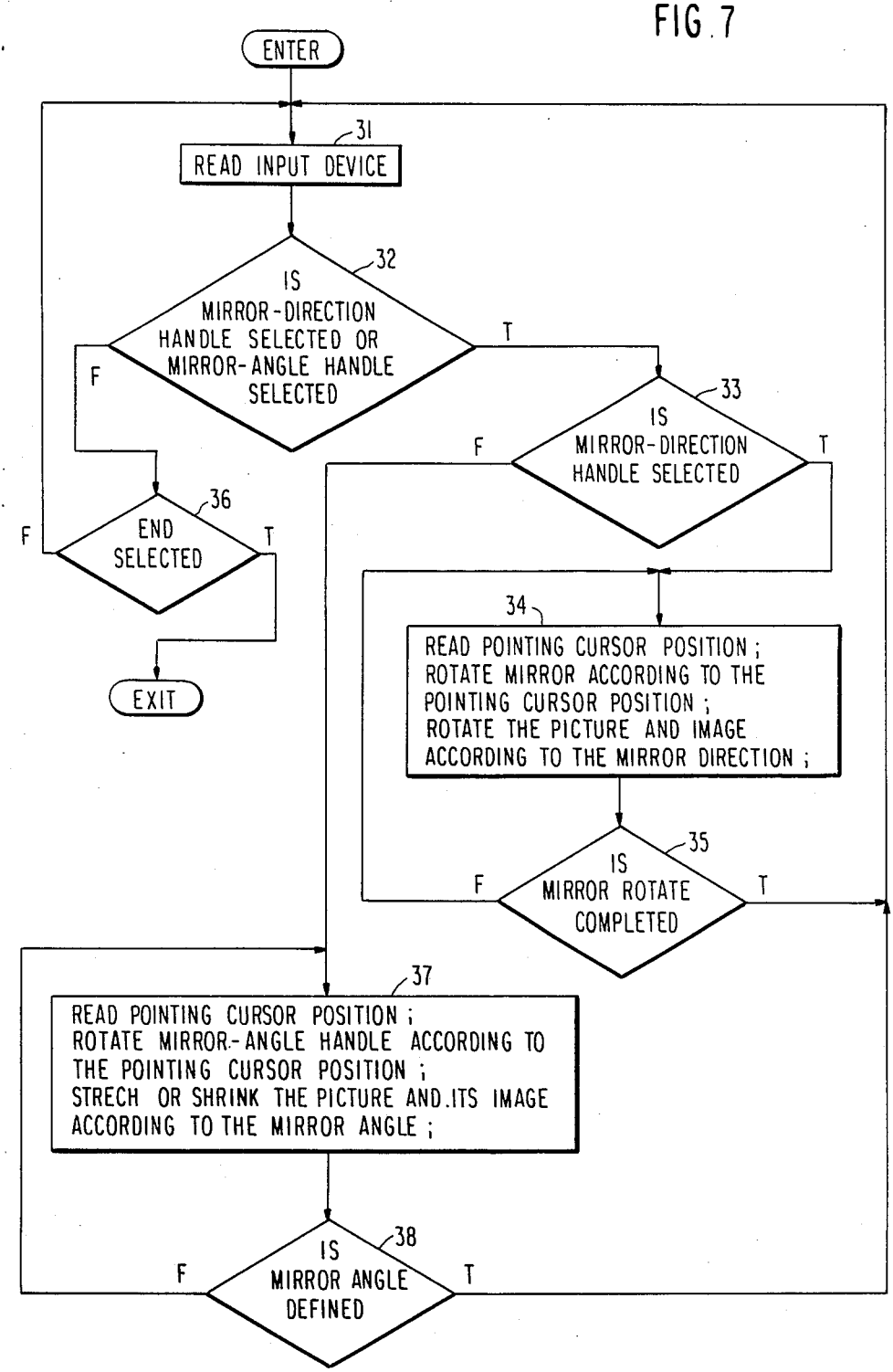
FIG. 7 is a flow chart of the mirror function according to the present invention.

FIG. 7 shows the flow chart for the mirror function just described. Before entering the flow chart, a graphic object is selected and the mirror action is selected. At this point, the second pop down window 26 is diplayed showing the mirror object 10 in its default position. In block 31 of the flow chart, the input device is read. The return from reading the input device is checked in block 32 to determine if either the mirror direction handle 12 or the mirror angle handle 14 has been selected. If not and no other action has been selected, control loops back to block 31 until either the mirror direction handle or the mirror angle handle is selected. When one of these handles is selected, a test is made in block 33 to determine if it is the direction handle which has been selected. If it is, then in block 34 the pointing cursor position is read and the mirror is rotated according to this position as long as the user maintains the select key pressed. Both the original image and its mirror image are rotated simultaneously. During this time, a check is made in block 35 to determine if the mirror rotation has been completed as indicated by the release of the select key. If not, the process continues to loop until the select key is released. Upon detecting that the select key has been released indicating that the mirror rotation has been completed, the process loops back to block 31 to read the input device. A test is made in block 36 to determine if the END function has been selected to terminate the mirror function. If so, the process ends; otherwise, it loops back to block 31 to again read the input device.

If in block 33 it is determined that the mirror direction handle 12 has not been selected, then it is the mirror angle handle 14 which has been selected causing the process to go to block 37. In block 37, the pointing cursor position is read and the mirror angle handle 14 is rotated according to the position of the pointing cursor. At the same time, the original image and its mirror image are simultaneously stretched or shrunk according to the angle between the mirror angle handle and the mirror. During this process, the select key is monitored in block 38 to determine if the mirror angle has been defined. As long as the select key is pressed, the process will loop, but when the select key is released, the mirror angle is defined. At this point, the process loops back to block 31 to again read the input device. Again, a check is made in block 36 to determine if the user has selected the END function from the command bar. If so, the process terminates; otherwise, the process continues to loop until either one of the mirror handles have been selected or the END function has been selected.

The following codes is written in program design language (PDL) which implements the mirror image function according to the invention and from which source code and object code can be easily derived.

```
REPEAT
READ INPUT_DEVICE
IF MIRROR_DIRECTION_HANDLE OR
MIRROR_ANGLE_HANDLE = SELECT THEN
IF MIRROR_DIRECTION_HANDLE = SELECT THEN
REPEAT
READ POINTING_CURSOR_POSITION
ROTATE MIRROR
ROTATE ORIGINAL_IMAGE AND MIRROR_IMAGE
UNTIL ROTATION COMPLETE
ELSE [MUST BE MIRROR_ANGLE_HANDLE = SELECT]
THEN
REPEAT
READ POINTING_CURSOR_POSITION
ROTATE MIRROR_ANGLE
STRETCH OR SHRINK ORIGINAL_IMAGE AND
MIRROR_IMAGE
UNTIL MIRROR_ANGLE ROTATION COMPLETE
ENDIF
ENDIF
UNTIL END = SELECT
```

In this code, the input device such as a mouse is read by calling a routine for that purpose (READ INPUT DEVICE), and the return is checked to determine if either the mirror direction handle or the mirror angle handle have been selected. If the mirror direction handle is selected (MIRROR_DIRECTION_HANDLE=SELECT), then the position of the pointing cursor is read. Depending on the return from reading the position of the pointing cursor, the mirror in the pop down window is rotated (ROTATE MIRROR) and the original image and its mirror image are rotated (ROTATE ORIGINAL_IMAGE AND MIRROR_IMAGE). The rotation function continues until it is deselected by releasing the select key on the mouse. If the mirror angle handle is selected (MIRROR_ANGLE_HANDLE=SELECT), the position of the pointing cursor is also read but in this case, depending on the return from reading the position of the pointing cursor, the angle of the mirror in the pop down window is rotated (ROTATE MIRROR_ANGLE) and the original image and the mirror image are simultaneously stretched or shrunk (STRETCH OR SHRINK ORIGINAL_IMAGE AND MIRROR_IMAGE). The process continues until the user selects another function which in the illustrative example is END.

While the invention has been described in terms of a single preferred embodiment, those skilled in the art will understand that that embodiment can, in practice, be modified with out departing from the spirit or scope of the invention.

Having thus described my invention, what I claim as new and desire to secure by grant of Letters Patent is as follows:

1. A method of generating a mirror image of a graphic object on an interactive computer graphics display comprising the steps of:

selecting an object on said display and selecting a mirror edit function for the selected object on said display;

generating a mirror image of the selected object and simultaneously displaying both the generated mirror image and the selected object on said display; and displaying a mirror control object in a window on said display, said mirror control object having a mirror direction handle and a mirror angle handle which may be selected and rotated to simultaneously manipulate the generated mirror image and the selected object on said display, wherein the manipulation of the generated mirror image and the selected object comprise the steps of:

rotating the generated mirror image and the selected object in the plane of the display as a function of the manipulation of the mirror direction handle; and simultaneously stretching or shrinking the generated mirror image and the selected object on the display as a function of the manipulation of the mirror angle handle.

2. The method of generating a mirror image of a graphic object as recited in claim 1 further comprising the steps of:

reading from an input device to determine if either of said mirror direction handle or mirror angle handle have been selected;

performing said step of rotating if the mirror direction handle is selected; and performing said step of simultaneously stretching or shrinking if the mirror angle handle is selected.

3. The method of generating a mirror image of a graphic object recited in claim 2 further comprising the step of reading said input device to detect when a terminate function is selected to end the process.

* * * * *